(12) United States Patent
Olsson et al.

(10) Patent No.: US 8,785,623 B2
(45) Date of Patent: Jul. 22, 2014

(54) MAGNETIC NANOPARTICLE CELLULOSE MATERIAL

(75) Inventors: Richard T. Olsson, Lidingö (SE); My Ahmed Said Samir Azizi, Agadir (MA); Lars Berglund, Åkersberga (SE); Ulf W. Gedde, Huddinge (SE)

(73) Assignee: Cellutech AB, Stockholm (SE)

(*) Notice: Subject to any disclaimer, the term of this patent is extended or adjusted under 35 U.S.C. 154(b) by 840 days.

(21) Appl. No.: 12/593,599

(22) PCT Filed: Mar. 31, 2008

(86) PCT No.: PCT/SE2008/050366
§ 371 (c)(1),
(2), (4) Date: Apr. 23, 2010

(87) PCT Pub. No.: WO2008/121069
PCT Pub. Date: Oct. 9, 2008

(65) Prior Publication Data
US 2010/0203313 A1    Aug. 12, 2010

Related U.S. Application Data

(60) Provisional application No. 60/908,684, filed on Mar. 29, 2007.

(30) Foreign Application Priority Data

Mar. 29, 2007 (SE) ........................ 0700795

(51) Int. Cl.
*B32B 5/16* (2006.01)
*B32B 5/02* (2006.01)
*D21F 13/00* (2006.01)
*D21H 13/00* (2006.01)
*D21H 17/00* (2006.01)

(52) U.S. Cl.
USPC ............. 536/101; 536/56; 977/773; 977/778; 977/779; 442/152; 442/153; 442/165; 428/221; 428/311.71; 428/323; 428/548; 428/549; 162/138; 162/146; 162/157.6; 162/181.5; 162/182

(58) Field of Classification Search
USPC .................... 428/221, 311.71, 323, 548, 549; 977/773, 778, 779; 442/152, 153, 165; 162/138, 146, 157.6, 181.5, 182; 536/56, 101
See application file for complete search history.

(56) References Cited

U.S. PATENT DOCUMENTS 5,143,583 A * 9/1992 Marchessault et al. ........ 162/138
5,204,457 A * 4/1993 Maruno et al. ................. 536/101
(Continued)

FOREIGN PATENT DOCUMENTS

EP          0450092 A1    10/1991
JP          60-23429 A     2/1985
(Continued)

OTHER PUBLICATIONS

Raymond et al., "In situ synthesis of ferrites in ionic and neutral cellulose gels," Polymer, vol. 36, No. 26, pp. 5035-5043 published in 1995.*

(Continued)

*Primary Examiner* — Matthew Matzek
(74) *Attorney, Agent, or Firm* — Morrison & Foerster LLP

(57) ABSTRACT

The present invention relates to ferromagnetic materials based on nano-sized bacterial cellulose templates. More specifically, the present invention provides an agglomerate free magnetic nanoparticle cellulose material and a method of forming such magnetic nanoparticle cellulose material. Further, the magnetic nonoparticles are physically attached on the cellulose material and evenly distribute.

23 Claims, 3 Drawing Sheets

(56) References Cited

U.S. PATENT DOCUMENTS

| | | |
|---|---|---|
| 7,431,862 B2 | 10/2008 | Mehrotra et al. |
| 7,485,720 B2 | 2/2009 | Yamane et al. |
| 2004/0146855 A1 | 7/2004 | Marchessault et al. |
| 2007/0090923 A1 | 4/2007 | Kraft et al. |

FOREIGN PATENT DOCUMENTS

| | | |
|---|---|---|
| JP | 61-81443 A | 4/1986 |
| JP | 62-74940 A | 4/1987 |
| JP | 3-134001 A | 6/1991 |
| JP | 2004-147580 A | 5/2004 |
| WO | WO-2004/107368 A2 | 12/2004 |

OTHER PUBLICATIONS

Carrazana-Garcia, J.A. et al. (1997). "Characterization of ferrite particles synthesized in presence of cellulose fibers," *Colloids and Surfaces, A: Physiochemical and Engineering Aspects* 121:61-66.

He, J. et al. (2003). "Facile in Situ Synthesis of Noble Metal Nanoparticles in Porous Cellulose Fibres," *Chemistry of Materials* 15:4401-4406.

International Search Report mailed Jun. 27, 2008, for PCT Application No. PCT/SE2008/050366 filed Mar. 31, 2008, 4 pages.

International Written Opinion mailed Jun. 27, 2008, for PCT Application No. PCT/SE2008/050366 filed Mar. 31, 2008, 7 pages.

Kotel'Nikova, N.E. et al. (2006). "Cellulose Matrix as a Nanoreactor for Preparing Nanoparticles of Nickel and Its Hydrazine Dihydrochloride as Reductant," *Russian Journal of Applied Chemistry* 79(11):1902-1906.

Lalatonne et al. (Feb. 2004). "Van der Waals versus dipolar forces controlling mesoscopic orginizations of magnetic nanocrystals," *Nature Material* 3:121-125.

Raymond, L. et al. (1995). "In situ synthesis ferrites in ionic and neutral cellulose gels" *Polymer* 36(26):5035-5043.

Sourty, E. et al. (1998). "Characterization of magnetic membranes based on bacterial and man-made cellulose," *Cellulose* 5:5-17.

Sourty, E. et al. (1998). "Ferrite-loaded Membranes of microfibrillar Bacterial Cellulose Prepared in Situ Preparation," *Chemistry of Materials* 10(7):1755-1757.

Yano et al. (2005). "Optically Transparent Composites Reinforced With Networks of Bacterial Nanofibers," *Advanced Materials* 17:153-155.

International Preliminary Report on Patentability and Written Opinion of the International Searching Authority mailed Oct. 8, 2009, for PCT Application No. PCT/SE2008/050366, filed Mar. 31, 2008, 9 pages.

Extended European Search Report received for European Patent Application No. 08724312.7 mailed on Jun. 1, 2011, 9 pages.

Office Action received for Chinese Patent Application No. 200880010097.7 issued on Jan. 29, 2013, 15 pages (7 pages of English Translation and 8 pages of Office Action).

Office Action received for Japanese Patent Application No. 2010-500881 mailed on Jan. 29, 2013, 11 pages (6 pages of English Translation and 5 pages of Office Action).

Marchessault et al., "In Situ Synthesis of Ferrites in Lignocellulosics", Carbohydrate Research, vol. 224, 1992, pp. 133-139.

Raymond et al., "In Situ Synthesis of Ferrites in Cellulosics", Chemical Mater, vol. 6, No. 2, 1994, pp. 249-255.

Office Action received for Chinese Patent Application No. 200880010097.7, issued on Aug. 31, 2011, 10 pages (6 pages of English Translation and 4 pages of Office Action).

Office Action received for Chinese Patent Application No. 200880010097.7, issued on Jul. 4, 2012, 7 pages (4 pages of English Translation and 3 pages of Office Action).

Office Action received for Swedish Patent Application No. 0700795-8, issued on Oct. 5, 2007, 4 pages.

Office Action received for Japanese Patent Application No. 2010-500881, mailed on May 21, 2013, 6 pages (3 pages of English Translation and 3 pages).

Nakagaito et al., "Novel High-Strength Biocomposites Based on Microfibrillated Cellulose Having Nano-Order-Unit Web-Like Network Structure", Applied Physics A, vol. 80, 2005, pp. 155-159.

Nakagaito et al., "The Effect of Morphological Changes from Pulp Fiber towards Nano-Scale Fibrillated Cellulose on the Mechanical Properties of High-Strength Plant Fiber based Composites", Applied Physics A, vol. 78, 2004, pp. 547-552.

\* cited by examiner

MAGNETIC NANOPARTICLE CELLULOSE MATERIAL

CROSS REFERENCE TO RELATED APPLICATIONS

This application is a U.S. National Phase application of PCT/SE2008/050366, filed Mar. 31, 2008, which claims priority to Sweden Patent Application Serial No. 0700795-8, filed Mar. 29, 2007, and U.S. Provisional Application Ser. No. 60/908,684, filed Mar. 29, 2007, the contents of which are hereby incorporated by reference in the present disclosure in their entirety.

BACKGROUND OF THE INVENTION

Magnetic nanoparticles with large surface to bulk ratio is a growing area of interest. Considering the potentially large area of application of magnetic nanoparticles, as filler materials of various polymer materials, it can easily be understood that their relatively poor representation in comparison to micron-sized filler materials in polymers is an effect of the difficulties related to the processing of high-surface area nanoparticles. The explanation mainly lies in the fact that large surface areas also brings problems in achieving evenly distributed nanoparticle systems due to the favoured particle-particle interaction in comparison to particle-polymer/liquid interactions. The result is often severe agglomeration and aggregates of nanoparticles. The agglomerates in turn affect many macroscopic properties, such as mechanical, optical and magnetic etc. since these properties on a macroscopic scale are affected by the degree of close interaction at the nano scale level. In order to exploit the effects of nano-sized magnetic nanoparticles employed as fillers in organic matrix materials, the control over dispersion is therefore an unavoidable prerequisite.

Agglomeration of magnetic nanoparticles can be explained as a result of short-range isotropic forces and long-range anisotropic forces as well as poor compatibility between the surface of the inorganic nanoparticles and the matrix material. Different strategies to eliminate or reduces the interactive forces have been presented in literature. For example; It was reported that the primary reason of agglomeration in a non-polar solvent system can be explained as a relation to the strong influence of short distance van der Waals attractions, provided the dipole-dipole interactions between the particles were comparatively weak Lalatonne et al. (Nature Materials vol 3, February 2004). Lalatonne et al. demonstrated that the creation of agglomerates (clusters of nanoparticles) of 10 nm maghemite could be overcome to great extent by creating a non-polar spacer of sufficient number of carbon atoms between the nanoparticles, which reduced the interactions to great extent in a nonpolar solvent.

On the contrary, as particle sizes are increased and dipolar forces become dominant, it has been shown that abrupt transitions from separate particles to randomly oriented linear agglomerates/aggregates appears. However, as the majority of liquids and polymer systems exhibit various degree of polarity, the dispersion of magnetic nanoparticles is not simply solved by surface modifying the nanoparticles with one coating due to the fact that the surface coating with optimal solubility for a specific liquid polymer system is not the same for different system with different chemical character. In addition, the coating procedure of the magnetic nanoparticles can potentially make dispersion even more difficult due to the potential risk of obtaining coated agglomerates rather than single particles. Agglomerates are quickly formed when producing a magnetic material by precipitating transition metal salts already in the precipitation phase due to the magnetic forces between the particles. Considerably stronger agglomerates are formed when the particles are dried, i.e. it is extremely difficult to distribute these particles in polymers. Thus, the unique features relating to the particles being in the nano-scale range (1-200 nm) and that they consist of individual crystals can not be taken advantage of since functional material properties related to the nano-scopic dimension are negated.

Agglomeration is a major problem since the magnetic properties of a hybrid material on a macroscopic scale depend on the degree of agglomeration and is related to the degree of exchange coupling and dipolar forces between particles in the hybrid material. Coating the nanoparticles has also been investigated. But there are several problems with this technique such as not only one coating works in all situations for different polymers and no solution has been suggested how to optimize the coating in respect of the polymer matrix to have an optimal solubility.

US2007090923 suggests that aminated groups bound to the surface can be used to prevent agglomeration.

E. Sourty et. al. (Ferrite-loaded membranes of microfibrillar Bacterial Cellulose Prepared by in Situ Precipitation. Chem. Mater., Vol. 10, No. 7, 1998), relates to microfibrillar bacterial cellulose prepared in situ and discusses that the preparation of a uniform nanocomposite is extremely difficult. It is suggested to apply paper fabrication technology using micofibrils with attached ferrites. However, the transmission electron micrograph illustrates that the agglomeration problem persists.

US20050245658, discloses a wettable polymer having ion-exchangeable groups to form metal oxides trapped within the polymer structure. Further, a technique for the synthesis of magnetic nanocomposites is disclosed where the polymers have ion exchangeable groups attached.

Yano et al. (Optically transparent composites reinforced with networks of bacterial nanofibres, Adv. Mater. 17, 153-155, 2005), has shown that dried bacterial cellulose can be impregnated with resins such as epoxy, acrylic, and phenol-formaldehyde under vacuum. The new material increased in weight and got new physical properties. The resin used by Yano et al. resulted in a mechanically stable and flexible transparent material. By using a similar approach as Yano et al., a new magnetic nanoparticle containing material can be made.

Therefore there is a need within the technical field of magnetic nanoparticle cellulose material to solve the agglomeration problem. Especially, since the agglomerates in turn affect many macroscopic properties, such as mechanical, optical and magnetic etc. since these properties on a macroscopic scale are affected by the degree of close interaction at the nano scale level.

SUMMARY OF THE INVENTION

The foregoing problem is solved by a method and a material according to the invention. Therefore, it is an object of the present invention to provide a method of forming such magnetic material using a cellulose material. In a further aspect of the invention, there is provided an agglomerate free magnetic nanoparticle material with high mechanical properties.

It is therefore an advantage of the invention to provide a new method and a magnetic nanoparticle cellulose material with ordered interconnected organic and inorganic phases on the nano-scale. Further, the new magnetic nanoparticle cellulose material with a network of cellulose nanofibres as scaffold can be used for the production of new functional nano-materials. Further, it can be used for in-situ precipitation of inorganic nanoparticles within the cellulose network, to produce evenly distributed nanoparticles inside an organic matrix and to prepare nano-functional lightweight "foam-like" materials with very low apparent density based on bacterial cellulose and provide possibilities to prepare magnetic hydrogels based on cellulose.

In one embodiment the new method provides possibilities to prepare high mechanical performance nanoparticle functional hybrid films. In another embodiment cast three-dimensional magnetic polymer composites are provided. Such composites are obtained by impregnation of the scaffold by a polymer, prepolymer or monomer liquid, followed by solidification The magnetic nanoparticle cellulose material can be used within a broad range of applications. To illustrate the broad application area a number of different applications are suggested below without being limited in any way. The magnetic nanoparticle cellulose material can be used within the acoustical industry (loud-speaker membrane), magnetic filtration systems, chemical analysis methods, separation methods, etc.

Other advantages of the invention is to provide products such as; superfine magnetic filters/sieves, magnetic filtration set-ups activated by external field, catalytic support structures high-sensitivity magnetic membranes, magnetic films with uniformly/evenly distributed nanoparticles, microwave absorbers, magnetic foams based on nanoparticles, support structure for ferro-fluid based dampeners and template structures for fabrication of nanocomposites characterized by evenly distributed nanoparticles, i.e. sensitive electromagnetic switches, generators, magnetic actuators, magnetic storage media, etc.

The method makes it possible to produce highly reproducible magnetic nanoparticle cellulose material.

In a yet another embodiment the use of the polymer magnetic nanoparticle cellulose material provides a new type of "nanocomposite" where all constituents are dimensioned in the nano-scale range and the inorganic nanoparticle phase is distributed inside the material (cellulose nanofibre network). Since the bacterial cellulose hydrogel is a readily available material with high mechanical integrity due to the nanometrically scaled fibrils, the invented material with its possibilities to be modified for specific applications becomes particularly interesting. Additional modifications on top of what has been described above can also be made due to the facile direct impregnation of the freeze-dried bacterial cellulose. Various monomers can be used for in-situ polymerization/cross-linking after impregnation of the freeze-dried aerogel. Reactive monomers can effectively be soaked in to the material and crosslinked inside the material in order to create a rigid matrix material. Such modifications can potentially improve the functionalized material.

It should be noted that the effect of evenly distributed magnetic nanoparticles of course primarily affects the magnetic properties of the material. However, the effects of evenly distributed nanoparticles affect several other important material properties such as light scattering, mechanical properties, no reduction of surface area, etc.

Other objects and advantages of the present invention will become apparent from the following description and examples.

DEFINITIONS

For purposes of this invention, the term "cellulose material" is intended to encompass native cellulose. Cellulose is found in plants, a few animals and a few bacteria as microfibrils 2-20 nm in diameter depending on organism source. Cellulose material exists in nature as reinforcing phase in plant cell walls, and in other organisms such as bacteria or tunicate animals. Cellulose is found in cotton, paper, wood pulp etc. After disintegration of microfibrils from the organism, the cellulose material is usually termed microfibrillated cellulose (MFC). The starting form of microfibrillated cellulose (MFC) is typically as a suspension of MFC in liquid, where the solid MFC content is less than 10% by volume. It is found in the form of crystalline microfibrils consisting of polyglucan molecules in extended chain conformation. The length can be several micrometers and therefore the aspect ratio (ratio of length to diameter) is very large.

The term "bacterial cellulose" is intended to encompass any type of cellulose produced via fermentation or synthesised of a bacteria of the genus *Acetobacter xy* such as *linum, Alcaligenes, Pseudomonas, Acetobacter, Rhizobium, Argobacterium, Scarcina, Enterobacter* and includes materials referred popularly as microfibrillated cellulose, reticulated bacterial cellulose, microbial cellulose and the like. In addition prokaryotic organisms such as the prokaryotic cyanophycean alga *Nostoc* are encompassed. Further, the term "bacterial cellulose" as used in this invention refers to a product essentially free of residual bacteria cells made under agitated culture conditions by a bacterium of the genus *Acetobacter*. Bacterial celluloses are normally available in a gel produced by the bacteria.

The term "magnetic cellulose" is intended to encompass a material, referred to as a material consisting of both an inorganic particles fraction/phase with magnetic properties and an organic carbon-based phase/fraction.

The term "mild oxidation agent" is intended to encompass any type of oxidating media which is capable of oxidizing ferrous ions to ferric ions to a sufficient extent that magnetic particles can be obtained (ferrites).

The term "transition metal ions" is intended to encompass metal ions such as all elements in the periodic table that can be used to obtain ironoxide based magnetic nanoparticles.

The term "coordination compounds and d-block elements" is intended to encompass metal compounds/elements such as Manganese/Iron/Cobalt, Zinc etc. d-block elements are also referred to as transition metals, the d-block elements in period 4 are Sc, Ti, V, Cr, Mn, Fe, Co, Ni, Cu, Zn.

The term "alkaline solution" is intended to encompass NaOH, KOH, LiOH, $NH_3$, and the like.

The term "metal hydroxide/oxide complex" is intended to encompass coordination complexes that are created upon dissolving metal salts in a liquid phase.

The term "freeze drying" is intended to encompass a method to sublime solid water (ice) to gas phase.

The term "metal salt solution" is intended to encompass metal ions such as $Co^{2+}$, $Fe^{2+}$, $Fe^{3+}$, $Mn^{2+}$ and the like, generated form the corresponding salts. The term "magnetic nanoparticle cellulose material" is intended to encompass a material comprising a fibre network, interconnected.

The term "magnetic nanoparticles physically attached on the cellulose material" is intended to encompass magnetic nanoparticles in the size region 1-200 nm.

The term "evenly distributed" is intended to encompass that the nanoparticles are mostly separated, i.e. no agglomerate formation.

The term "agglomerate" is defined herein as a collection of nanoparticles adhering together or laying very close together, i.e. ≤5 nm particle to particle inter-distance and the collection of nanoparticles is composed of 20 or more nanoparticles. An agglomerate material (non-uniform) would have more than 30% of the nanoparticles lying in above entities of 20 or more nanoparticles.

The bacterial cellulose utilized herein may be of any type associated with the fermentation product of *Acetobacter* genus microorganisms, and was previously available from CPKelco U.S. under the tradename CELLULON®.

DETAILED DESCRIPTION OF THE INVENTION

Figure 1:
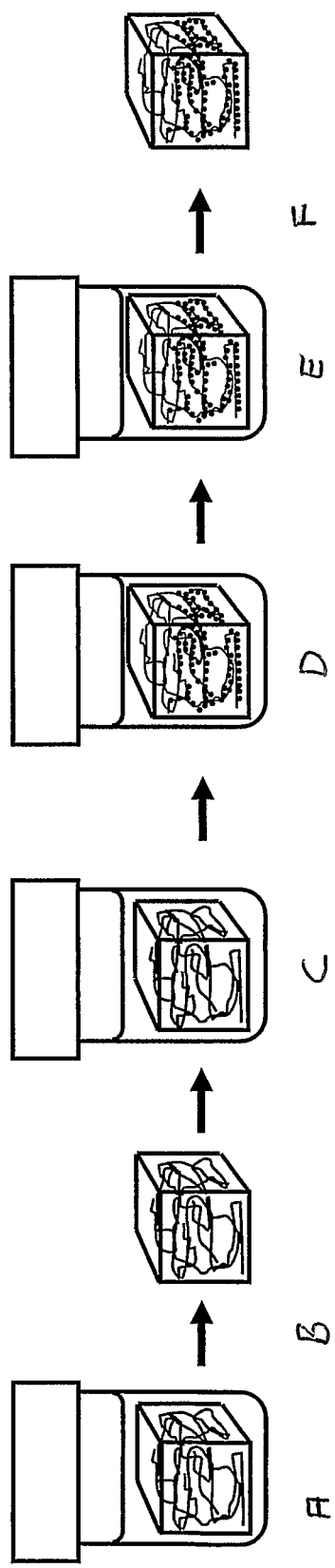
FIG. 1 shows the outline of the method for making the magnetic nanoparticle cellulose material (=ferromagnetic aerogel). In this embodiment the letter means A) the cellulose material in a solution, B) freeze drying, C) submers the cellulose material in a solution of metal ion, D) precipitate the metal ions on the cellulose material, E) convert the precipitated metal hydroxid/oxid to magnetic nanoparticles, and F) remove the solvent.
Figure 2:
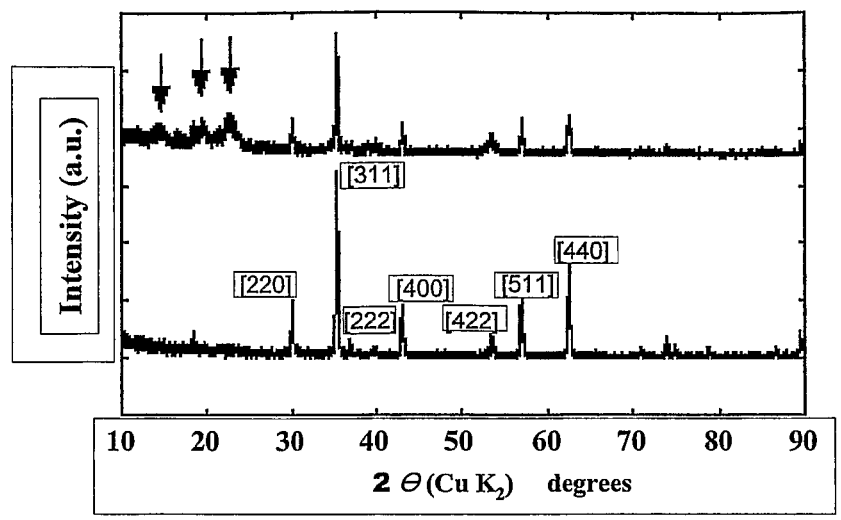
FIG. 2 shows x-ray diffractogram confirming that the magnetic crystalline particle phase consists of spinel ferrite nanoparticles. The peaks were index matched with the Miller indices corresponding to the reflections of $CoFe_2O_4$ (JCPDS Card No. 22-1086). The x-ray data refers to samples obtained using procedure exemplified in example 1 and 3, which generated 40 and 95 nm average particle sizes, respectively. The upper curve represents the results from Ex. 1 and the lower results from Ex. 3.

In one aspect of the invention, there is provided a magnetic nanoparticle cellulose material wherein the magnetic nanoparticles are evenly distributed onto the material and are free from agglomerate.

The magnetic nanoparticle cellulose material can be characterised as the collection of nanoparticles adhering together or laying very close together, i.e. ≤5 nm particle to particle inter-distance and an entity is composed of less than 20 nanoparticles.

The magnetic nanoparticle cellulose material can further be characterised in that the density range is between 5-100 $kg/m^3$ and the nanofibre diameter is in the range of 1-100 nm, typical in the range of 4-20 nm, 20-50 nm, 50-70 nm, and 70-90 nm. The density ranges relates to the specific application of the magnetic nanoparticle cellulose material thus other ranges could be 5-10 $kg/m^3$, 5-50 $kg/m^3$, 50-100 $kg/m^3$, 50-500 $kg/m^3$ and 500-1000 $kg/m^3$.

Magnetic nanoparticle cellulose material which is a hydrogel or an aerogel.

The magnetic nanoparticle cellulose material can further be characterised in that the ferrite volume fraction in final magnetic cellulose material is in the range of 10-90%. Other possible ranges are 10-30%, 30-50%, 50-70% and 70-90%.

The magnetic nanoparticle cellulose material is further characterised in that the precipitated magnetic nanoparticles size are in the range of 1-500 nm referred to as the number average particle size determined by Transmission Electron Microscopy, Scanning Electro Microscopy or similar method. The size of the nanoparticles can be controlled and is related to the concentration of the metal ions, which is shown in the results in Example 1-3.

In a further aspect of the invention, there is provided a method for forming magnetic nanoparticle cellulose material comprising the steps of:

a) providing cellulose material in a solution,
b) adding the cellulose material from step (a) to a solution of metal ions,
c) precipitating the metal hydroxide/oxide complexes formed in the solution from step spreading/distributing the precipitated complexes on the cellulose material (b),
d) adding the precipitated metal hydroxide/oxide complexes to an alkaline solution converting the hydroxide/oxide complexes to magnetic nanoparticles, and
e) freeze-drying or solvent exchanging the material from step (d) to preserve the agglomerate free and evenly distributed magnetic nanoparticles physically attached on the cellulose material.

In one embodiment where the step (a) is providing cellulose material in a liquid suspension.

In another embodiment step (b) is replaced with step (b')
b') freeze-drying the cellulose solution from step (a), in order to remove the $H_2O$ in the cellulose material, then adding the freeze-dried solution to a solution of metal ions.

The method wherein the alkaline solution in step (d) is chosen from NaOH, $NH_3$ and the like, providing a pH above 7.0.

The method wherein the metal ions in the solution is selected from the coordination compounds including divalent or trivalent atoms from the d-block elements in the periodic table such as $Co^{2+}$, $Fe^{2+}$, $Mn^{2+}$, $Fe^{3+}$ or metal ion hydroxide complexes or metal ion oxide complexes. The concentration range could be between 0.005 molar-saturated solution.

The method wherein the stoichiometric relation between the metal ion complexes are in the rage of 1:1.5 to 1:2.5.

The method of claim 1 wherein step (b) is performed until the cellulose material is saturated.

The method wherein the alkaline solution in step (d) comprises NaOH and a mild oxidation agent and in a specific embodiment the alkaline solution in step (d) comprises NaOH and $KNO_3$. Further, the alkaline solution in step (d) has an initial pH of above 7.0.

The method wherein the alkaline solution in step (d) comprises a dissolved mild oxidation agent that oxidise the metal ions to their preferred state in the spinel ferrite nanoparticles.

The method wherein the solution in step (c) is heated to above 50° C., at 1 atm. If ammonium is used ambient temperature could be used.

The method wherein the precipitated magnetic nanoparticles can be referred to as magnetic particles, super-paramagnetic, paramagnetic, ferri-magnetic or ferro-magnetic and thus showing such properties.

The method wherein a polymer is added after step e).

The method wherein step (e) proceeds until the diffusion of the alkaline oxidising solution has equilibrated/saturated the network and converted the metal hydroxide/oxide complexes to magnetic nanoparticles, i.e: the agglomerate free and evenly distributed magnetic nanoparticles are physically attached on the cellulose material.

The method wherein the cellulose material is bacterial cellulose material. Bacterial cellulose material could be treated with solution of NaOH in bath of boiling water to allow the total removal of the bacteria. Thereafter the material is washed with deionized water and stored at room temperature before use.

The method wherein the cellulose material is chosen from a plant, a tree, pulp or cotton.

The method wherein the magnetic nanoparticle cellulose material is a hydrogel or an aerogel. The aerogel could also be described as a porous fibril network of low density.

Thus in one embodiment if the cellulose material is bacterial cellulose material it could be treated with a solution of NaOH in bath of boiling water to allow the total removal of the bacteria. Thereafter the hydrogel is washed with de-ionized water and stored at room temperature before use.

Figure 4:
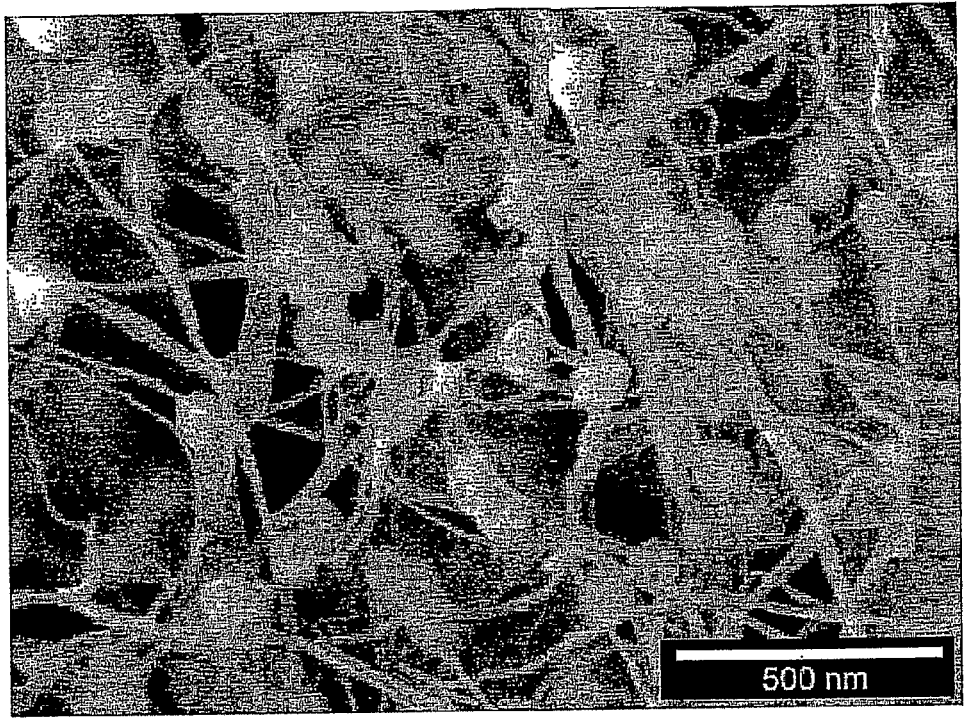
FIG. 4 shows high-resolution FE-SEM micrograph displaying the grafting (attaching) nature of the nanoparticles to the bacterial cellulose fibres.
Figure 5:
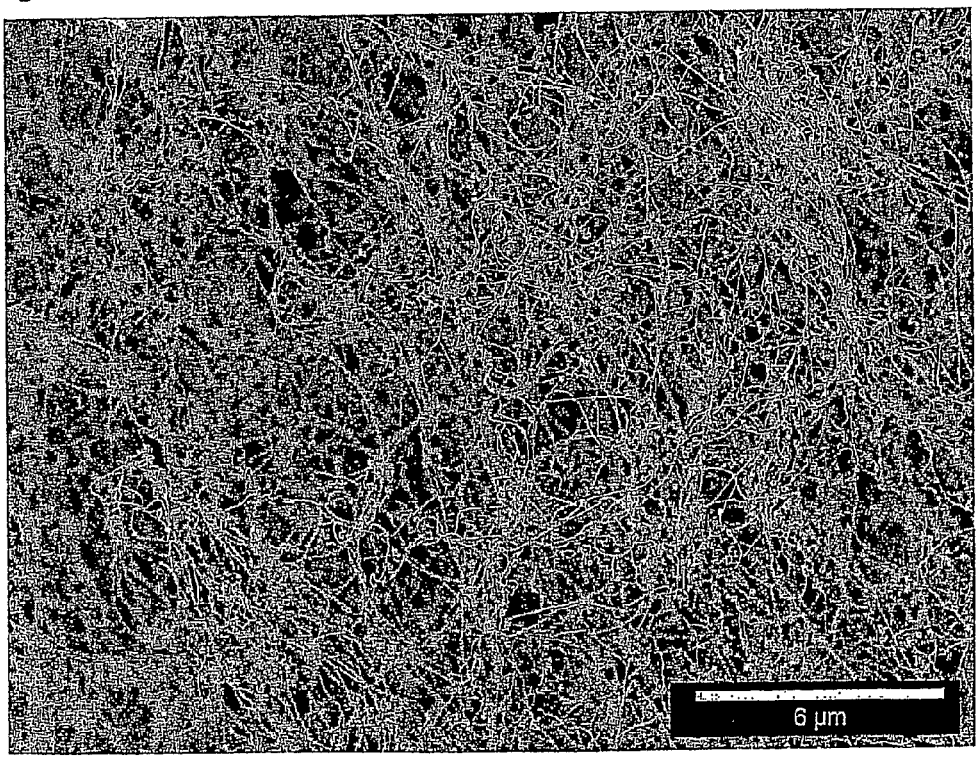
FIG. 5 shows low-resolution FE-SEM micrograph displaying the uniformity of the evenly distribute particles through out the material. It is further seen that the particles are physically attached to the fibres. The micrograph is taken on the material obtained using experiment procedure outlined in example 2.

The dried aerogel or the hydrogel is immersed in a metal ion solution where metal hydroxide/oxide complexes will be formed and grown by precipitation uniformly over the cellulose network. After addition of an alkaline oxidising solution the metal hydroxide/oxide complexes will be converted to magnetic nanoparticles i.e. the created magnetic nanoparticles are evenly distributed/separated uniformly over the cellulose network as shown in FIG. 4.

In another embodiment the magnetic nanoparticle cellulose material wherein the magnetic nanoparticle cellulose material fibre network is impregnated with a liquid of a monomer, a prepolymer or a polymer. Further embodiments is when the magnetic nanoparticle cellulose material and wherein the impregnated magnetic nanoparticle cellulose material is solidified.

In the case of magnetic nanoparticles, the great benefit of the new method and new magnetic nanoparticle cellulose material according to the invention is to produce agglomerate free magnetic nanoparticle cellulose material, magnetic nanocomposites. Nanocomposites based on ferromagnetic nanoparticles are considered to be among the most difficult to produce due to the addition of magnetoelastic interactions such as exchange (isotropic and anisotropic), super exchange, dipole-dipole interactions in addition to the chemical interactions such as van der Waals attractions. Eliminating these forces, interactions in agglomerates, results in composites behaving significantly different from ferromagnetic composites based on agglomerated nanoparticles. A composite based on non-agglomerated nanoparticles have properties such as reflecting the individual magnetic nanoparticles with single domain character.

In one embodiment the method comprises the steps of using freeze-dried bacterial cellulose as scaffold for in-situ precipitation of magnetic nanoparticles onto the nanofibres inside the matrix, i.e. the particles are bonded to the bacterial cellulosic fibres. The precipitation is generated by thermally forced hydrolysis of metal salt solution in order to create complexes (hydroxides/oxides), which have been allowed to precipitate in the confined space between the fibres before their conversion to their final magnetic phase. The freeze-drying technique of the bacterial cellulose results in an aerogel. The aerogel enables the inventors to overcome the difficulty to obtain a homogeneous and evenly distribution of metal salt complexes in the space between the fibres, since the metal salt solution easily saturates the hydrogel scaffold of nanofibres when it is soaked in the metal salt solution. The freeze-drying step further provides an undisturbed mechanically stable network of nanofibres with high surface area available for interaction with precipitation reagents. The cage-like spaces that exist between the fibres constitute a sort of nano-reactors, i.e. dimensions are in sub micron range.

It could be concluded that in one embodiment the method produces extremely evenly distributed and physically attached nanoparticles in a lightweight cellulosic nanofibres based network. The material is characterized by high interactive surface area both from the viewpoint of the nanoparticles and the cellulosic nanofibres. Previous attempts to prepare nanoparticles in the confined space between the nanofibres inside the fibre matrix have failed due to a number of unknown reasons. The inventors have concluded that it is essential to have complete control over the experimental conditions and methods. It can be concluded from the available literature that the methodology is unique in terms of using the cellulose such as bacterial cellulose. Important aspects of the discovery were the combination of the freeze drying technique and the establishment of the reaction conditions. Further, the aerogel from cellulose nanofibrils differs from other ceramic or polymer aerogels in the unique mechanical stability.

The preferred cellulose material is bacterial celluloses normally available in a gel produced by bacteria. The gel needs to be cleaned from bacteria. The gel is about 1% cellulose by weight as produced by the bacteria, and the rest is water. Cellulose has very high Youngs modulus, 130 GPa and strength, as a consequence, the gel is mechanically very stable despite the small cellulose content. Microfibrils from cellulose can also be disintegrated by chemical treatment of cellulose containing substance, normally plant tissue such as wood pulp or cotton. This cellulose is often called microfibrillated cellulose (MFC) and is often delivered as a suspension in water of about 2%, it also is gel-like in character, a gel is a solid material by definition due to its mechanical properties and lack of liquid flow, even if it contains 98% water. Cellulose can also be obtained from tunicates, and is then called TC, these are sea animals sitting on rocks, and they are filter feeders, they use a cellulose tunica as protection. TC also forms a gel in water. Microcrystalline cellulose is produced by acid hydrolysis of cellulose rich materials. The aspect ratio is low, typically 10-20, and therefore its gelforming capability is less than for MFC. The gel has not the same mechanical stability as for MFC or BC. The gel character of cellulose in water comes from nanofibre interaction with each other, they bond to each other and form a physical network, and this is facilitated by large aspect ratio.

Cellulose in the form of nanofibres called MFC, BC, TC, MCC form a gel in water already at low conc. The phenomenon will show also in other liquids. By removing the liquid "carefully" it is possible to preserve the physical network as a porous material in the form of an aerogel (low density) or xerogel (higher density). The volume fraction in the aerogel is low, typically in the range of 0.5-10%.

In a commercially available freeze dryer, the gel is quickly frozen, and then the water is sublimated by exposure to low pressure but still at low temperature. An aerogel remains. If the freezing is quick, the network structure in water is preserved and the quality by specific surface area can easily be measured. If the freezing is slow, the nanofibres agglomerate and the specific surface area becomes lower which could affect the network to be less useful in certain specific application.

A cellulose material such as an aerogel can also be made by solvent exchange. The gel is moved to a series of solvents. It is possible to start from a very polar liquid, water. Then the liquids of decreasing polarity are exchanged. For a given liquid, such as acetone, the start concentration is low and then the concentration is increased in steps by moving from vessel to vessel. A non-polar liquid has little interaction with cellulose, and then the aerogel can be made by just evaporating the solvent, with out collapse. Drying at room temperature will result in that the whole network collapses due to capillary forces.

The fibre network in the form of an aerogel can be made from BC (best quality aerogel), MFC, TC, MCC (worst quality aerogel). Freeze drying is mostly discussed in the application but solvent-exchange (liquid-exchange) could also be applied.

The aerogel piece is soaked in a solution of metal salt. The solutions with the immersed pieces of aerogel is heated in order to thermally force the precipitation of the metal salt solution to the related hydroxide/oxide structures of the metal ions inside the matrix network of aerogel. This matrix is then transferred into an alkaline solution. The piece is kept in this alkaline solution during a given time. During this process the metal ion will be oxidized and the magnetic inorganic oxide nanoparticles will be formed inside the cellulose network matrix.

The new method comprises in one embodiment the steps of using a preformed network of cellulosic nanofibres, with its confined space volumes working as nanometric reactors, for the precipitation of magnetic inorganic oxide nanoparticles. The spherical nanoparticles could be single-phase cobalt ferrite nanoparticles with sizes varying between approximately 1 and 500 mm. By adjusting the synthesis conditions, it is possible to control the average size of the nanoparticles between 1 and 500 nm, as determined by X-ray diffraction (XRD) and transmission electron micrograph (TEM).

Figure 3:
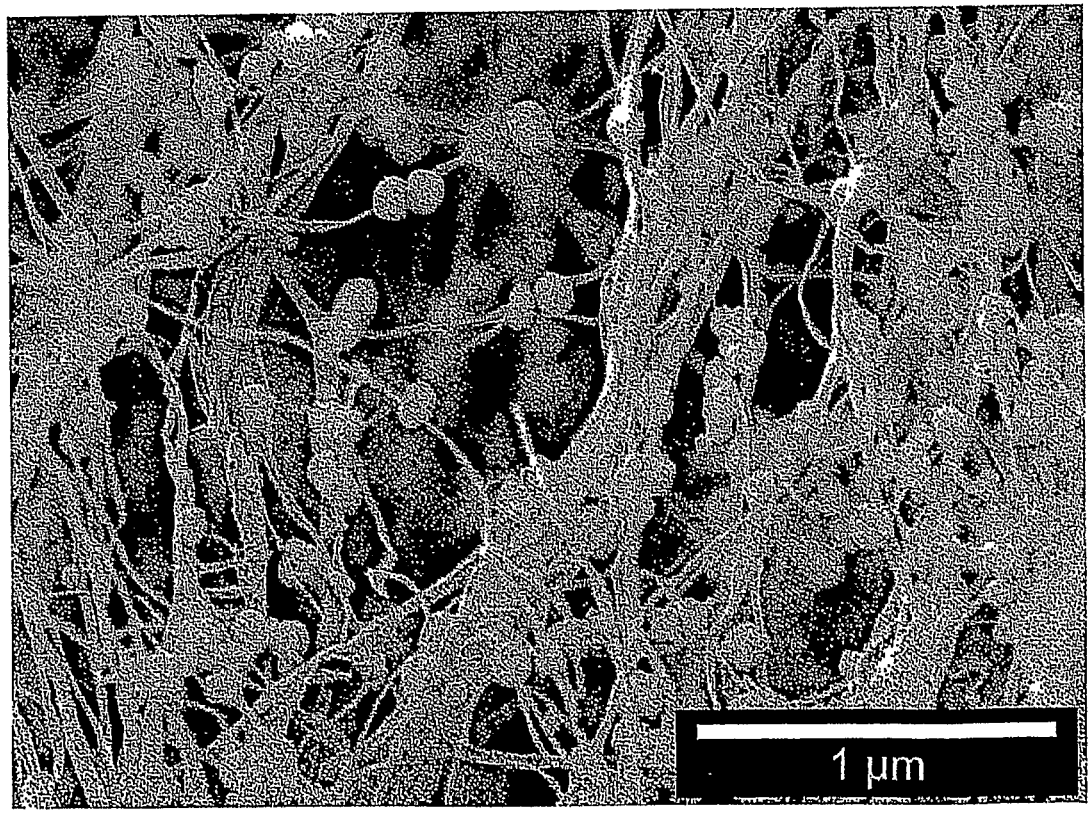
FIG. 3 shows high-resolution FE-SEM micrograph showing that particles are not arranged as large agglomerates.

FIG. 4 shows a micrograph that depicts the material with its evenly/finely distributed cobalt ferrite nanoparticles arranged inside the material. It can be seen that the magnetic nanoparticles are uniformly distributed on the fibres. The particles are not agglomerated even though the magnetic interactions between these particles are large due to the high coercivity values typically characteristic of the single domain cobalt ferrite nanoparticles. FIG. 3 shows that the particles are not arranged as agglomerates. FIG. 4 shows the grafting (attaching) nature of the nanoparticles to the bacterial cellulose fibres.

The following examples are intended only to further illustrate the invention and are not intended to limit the scope of the invention which is defined by the claims.

EXAMPLES

Example 1

($CoFe_2O_4$)

Precipitation of cobalt ferrite to form nanocrystals on the nanofibres of the bacterial cellulose.

1. A piece of gel-like bacterial cellulose (0.5×0.5×1.5 cm) is boiled with 10 vol % NaOH solution (3 h) and subsequentially washed with running distilled water (6 h) before immersion in liquid nitrogen followed by freeze-drying during a period of 12 hours.
2. The dry cellulose piece is swollen in freshly prepared MilliQ-water solution of metal salt consisting of $CoCl_2 \times 6H_2O$ (0.033 M) and $FeSO_4 \times 7H_2O$ (0.66 M), i.e. stoichiometric proportions of Co:Fe (1:2).
3. The solutions with the immersed pieces of cellulose is heated to 90° C. and kept at 90° C. for 3 h in order to thermally force the precipitation of the iron/cobalt salt solution to the related hydroxide/oxide structures of the cobalt/iron ions inside the matrix network of the bacterial cellulose.
4. The piece is transferred into a 90° C. solution of NaOH (1.32 M) with $KNO_3$ (0.15 M); ($[Fe^{2+}]*/[NO_3^-]=0.44$). The piece is kept in this alkaline solution, which is maintained at 90° C. for 6 h.
5. The piece is transferred into room temperature distilled water in order to neutralize the alkaline solution inside the cellulose network matrix.
6. The particle-modified cellulose network is washed with running distilled water for 6 h.
7. The particle-modified cellulose is immersed in liquid nitrogen, followed by freeze-drying until all water has been removed from the network.

The particles attached to the fibres were determined to have an average size of approx. 40-70 nm, as determined FE-SEM. The note (*) under step 4, refers to the concentration of iron in the solution used for swelling the bacterial cellulose, i.e. prior to the transfer of the cellulose into the alkaline solution.

Example 2

($CoFe_2O_4$)

1. A piece of gel-like bacterial cellulose (0.5×0.5×1.5 cm) is boiled with 10 vol % NaOH solution (3 h) and subsequentially washed with running distilled water (6 h) before immersion in liquid nitrogen followed by freeze-drying during a period of 12 hours.
2. The dry cellulose piece is swollen in freshly prepared MilliQ-water solution of metal salt consisting of $CoCl_2 \times 6H_2O$ (0.055 M) and $FeSO_4 \times 7H_2O$ (0.11 M), i.e. stoichiometric proportions of Co:Fe (1:2).
3. The solutions with the immersed pieces of cellulose is heated to 90° C. and kept at 90° C. for 3 h in order to thermally force the precipitation of the iron/cobalt salt solution to the related hydroxide/oxide structures of the cobalt/iron ions inside the matrix network of the bacterial cellulose.
4. The piece is transferred into a 90° C. solution of NaOH (1.32 M) with $KNO_3$ (0.25 M); ($[Fe^{2+}]*/[NO_3^-]=0.44$). The piece is kept in this alkaline solution, which is maintained at 90° C. for 6 h.
5. The piece is transferred into room temperature distilled water in order to neutralize the alkaline solution inside the cellulose network matrix.
6. The particle-modified cellulose network is washed with running distilled water for 6 h.
7. The particle-modified cellulose is immersed in liquid nitrogen, followed by freeze-drying until all water has been removed from the network.

The particles attached to the fibres were determined to have an average size of approx. 60-90 nm, as determined FE-SEM. The note (*) under step 4, refers to the concentration of iron in the solution used for swelling the bacterial cellulose, i.e. prior to the transfer of the cellulose into the alkaline solution.

Example 3

($CoFe_2O_4$)

1. A piece of gel-like bacterial cellulose (0.5×0.5×1.5 cm) is boiled with 10 vol % NaOH solution (3 h) and subsequentially washed with running distilled water (6 h) before immersion in liquid nitrogen followed by freeze-drying during a period of 12 hours.
2. The dry cellulose piece is swollen in freshly prepared MilliQ-water solution of metal salt (saturated) prepared by dissolving $CoCl_2 \times 6H_2O$ (0.33 M) and $FeSO_4 \times 7H_2O$ (0.66 M), i.e. stoichiometric proportions of Co:Fe (1:2).
3. The solutions with the immersed pieces of cellulose is heated to 90° C. and kept at 90° C. for 3 h in order to thermally force the precipitation of the iron/cobalt salt solution to the related hydroxide/oxide structures of the cobalt/iron ions inside the matrix network of the bacterial cellulose.
4. The piece is transferred into a 90° C. solution of NaOH (1.32 M) with KNO$_3$ (1.5 M); ([Fe$^{2+}$]*/[NO$_3^-$]=0.44). The piece is kept in the alkaline solution at 90° C. for 6 h.
5. The piece is transferred into room temperature distilled water in order to neutralize the alkaline solution inside the cellulose network matrix.
6. The particle-modified cellulose network is washed with running distilled water for 6 h.
7. The particle-modified cellulose is immersed in liquid nitrogen, followed by freeze-drying until all water has been removed from the network.

The particles attached to the fibres were determined to have an average size of approx. 80-150 nm, as determined FE-SEM. The note (*) under step 4, refers to the concentration of iron in the solution used for swelling the bacterial cellulose, i.e. prior to the transfer of the cellulose into the alkaline solution.

Example 4

(MnFe$_2$O$_4$)

1. A piece of gel-like bacterial cellulose (0.5×0.5×1.5 cm) is boiled with 10 vol % NaOH solution (3 h) and sub sequentially washed with running distilled water (6 h) before immersion in liquid nitrogen followed by freeze-drying during a period of 12 hours.
2. The dry cellulose piece is swollen in freshly prepared MilliQ-water solution of metal salt consisting of MnCl$_2$×4H$_2$O (0.055 M) and FeSO$_4$×7H$_2$O (0.11 M), i.e. stoichiometric proportions of Mn:Fe (1:2).
3. The solutions with the immersed pieces of cellulose is heated to 90° C. and kept at 90° C. for 3 h in order to thermally force the precipitation of the iron/cobalt salt solution to the related hydroxide/oxide structures of the cobalt/iron ions inside the matrix network of the bacterial cellulose.
4. The piece is transferred into a 90° C. solution of NaOH (1.32 M) with KNO$_3$ (0.25 M); ([Fe$^{2+}$*]/[NO$_3^-$]=0.44). The piece is kept in the alkaline solution at 90° C. for 6 h.
5. The piece is transferred into room temperature distilled water in order to neutralize the alkaline solution inside the cellulose network matrix.
6. The particle-modified cellulose network is washed with running distilled water for 6 h.
7. The particle-modified cellulose is immersed in liquid nitrogen, followed by freeze-drying until all water has been removed from the network.

The particles attached to the fibres were determined to have an average size similar to as in Example 2.

The methodology is described in general terms and the skilled person could make modifications that will fall within the scope of protection, i.e. several parameters can be varied to obtain similar results. This is further discussed below.

The bacterial cellulose does not necessarily need to be freeze-dried in step 1. The cellulose can actually be used as wet after cleaning. The loading of the metal salt solution is then relying on the osmosis of metal species into the cellulose network, however with this methodology it will take more time to fill the cellulose network with the metal salt solution and it will be more difficult to be ensure that the network is uniformly filled with metal species.

The freeze-drying procedure can in all steps be exchanged to a similar procedure generating the same result, i.e. an unperturbed porous open network available for the grafting of the nanoparticles to the walls of the cellulose.

The chemical parameters can also be varied. As an example, a metal salt solution with a stoichiometric composition of Co:Fe=1:2, can be varied at least between: Co:Fe=0.5:2 to Co:Fe=1.5:2, and in the case of precipitating magnetite nanoparticles divalent iron (Fe$^{2+}$) or a combination of divalent and trivalent iron has been used without being a limited to that. When the starting material is selected form metal salts containing ions with oxidation state that is the same as the oxidation state as in the final particles, then there is no need for KNO$_3$ as a mild oxidation agent.

The temperature is preferred to be as high as possible, such as above 65° C., 75° C., 85° C., 90° C., etc., since at lower temperatures around 50° C. the process could generate a different phase, i.e. not the pure spinel phase synonymous with the ferrite material. However, the temperature is not limited to the specific mentioned above and precipitation at room temperature also falls within the scope of protection.

Example 5

(MnFe$_2$O$_4$)

1. A piece of gel-like bacterial cellulose (0.5×0.5×1.5 cm) is boiled with 10 vol % NaOH solution (3 h) and sub sequentially washed with running distilled water (6 h) before immersion in liquid nitrogen followed by freeze-drying during a period of 12 hours.
2. The dry cellulose piece is swollen in freshly prepared MilliQ-water solution of metal salt consisting of MnCl$_2$×4H$_2$O (0.055 M) and FeSO$_4$×7H$_2$O (0.11 M), i.e. stoichiometric proportions of Mn:Fe (1:2).
3. The solution with the immersed piece of cellulose is heated to 90° C. and kept at 90° C. for 3 h in order to thermally force the precipitation of the iron/manganese salt solution to the related hydroxide/oxide structures of the manganese/iron ions inside the matrix network of the bacterial cellulose.
4. The piece is transferred into a solution of ammonia (12.5%, r.t.) with KNO$_3$ (0.25 M); ([Fe$^{2+}$]*/[NO$_3^-$]=0.44).* The piece is kept in the alkaline solution for 6 h.
5. The piece is transferred into room temperature distilled water in order to neutralize the alkaline solution inside the cellulose network matrix.
6. The particle-modified cellulose network is washed with running distilled water for 6 h.
7. The particle-modified cellulose is immersed in liquid nitrogen, followed by freeze-drying until all water has been removed from the network.

The particles attached to the fibres were determined to have an average size of approx. 60-150 nm, as determined from FE-SEM microscopy. (*) noted under step 4. Refers to the concentration of iron in the solution used for swelling the bacterial cellulose, i.e. prior to the transfer of the cellulose into the alkaline solution.

Example 6

(Fe$_3$O$_4$)

1. A piece of gel-like bacterial cellulose (0.5×0.5×1.5 cm) is boiled with 10 vol % NaOH solution (3 h) and sub sequentially washed with running distilled water (6 h)

before immersion in liquid nitrogen followed by freeze-drying during a period of 12 hours.
2. The dry cellulose piece is swollen in freshly prepared MilliQ-water solution of metal salt consisting of $FeSO_4 \times 7H_2O$ (0.055 M) and $FeCl_3 \times 6H_2O$ (0.11 M), i.e. stoichiometric proportions of $Fe^{2+}:Fe^{3+}$ (1:2).
3. The solution with the immersed piece of cellulose is heated to 90° C. and kept at 90° C. for 3 h in order to thermally force the precipitation of the iron salt solution to the related hydroxide/oxide structures of the iron ions inside the matrix network of the bacterial cellulose.
4. The piece is transferred into a water solution of ammonia (12.5%) at r.t. The piece is kept in the alkaline solution at 23° C. for 6 h.
5. The piece is transferred into room temperature distilled water in order to neutralize the alkaline solution inside the cellulose network matrix.
6. The particle-modified cellulose network is washed with running distilled water for 6 h.
7. The particle-modified cellulose is immersed in liquid nitrogen, followed by freeze-drying until all water has been removed from the network.

The particles attached to the fibres were determined to have an average size of approx. 30-50 nm, as determined from FE-SEM microscopy. A significant amount of the particles were smaller than 30 nm.

Example 7

($Fe_3O_4$)

1. A piece of gel-like bacterial cellulose (0.5×0.5×1.5 cm) is boiled with 10 vol % NaOH solution (3 h) and subsequentially washed with running distilled water (6 h) before immersion in liquid nitrogen followed by freeze-drying during a period of 12 hours.
2. The dry cellulose piece is swollen in freshly prepared MilliQ-water solution of metal salt consisting of $FeSO_4 \times 7H_2O$ (0.165 M).
3. The solution with the immersed piece of cellulose is heated to 90° C. and kept at 90° C. for 3 h in order to thermally force the precipitation of the iron salt solution to the related hydroxide/oxide structures of the iron ions inside the matrix network of the bacterial cellulose.
4. The piece is transferred into a 90° C. water solution of NaOH (1.32 M) with $KNO_3$ (0.25 M). The piece is kept in the alkaline solution at 90° C. for 6 h.
5. The piece is transferred into room temperature distilled water in order to neutralize the alkaline solution inside the cellulose network matrix.
6. The particle-modified cellulose network is washed with running distilled water for 6 h.
7. The particle-modified cellulose is immersed in liquid nitrogen, followed by freeze-drying until all water has been removed from the network.

The particles attached to the fibres were determined to have an average size of approx. 80-150 nm, as determined from FE-SEM microscopy.

Example 8

($Fe_3O_4$)

1. A piece of gel-like bacterial cellulose (0.5×0.5×1.5 cm) is boiled with 10 vol % NaOH solution (3 h) and subsequentially washed with running distilled water (6 h) before immersion in liquid nitrogen followed by freeze-drying during a period of 12 hours.
2. The dry cellulose piece is swollen in freshly prepared MilliQ-water solution of metal salt consisting of $FeSO_4 \times 7H_2O$ (0.055 M) and $FeCl_3 \times 6H_2O$ (0.11 M), i.e. stoichiometric proportions of $Fe^{2+}:Fe^{3+}$ (1:2).
3. The solution with the immersed piece of cellulose is heated to 90° C. and kept at 90° C. for 3 h in order to thermally force the precipitation of the iron salt solution to the related hydroxide/oxide structures of the iron ions inside the matrix network of the bacterial cellulose.
4. The piece is transferred into a water solution of NaOH (1.32 M) at 90° C. The piece is kept in the alkaline solution at 90° C. for 6 h.
5. The piece is transferred into room temperature distilled water in order to neutralize the alkaline solution inside the cellulose network matrix.
6. The particle-modified cellulose network is washed with running distilled water for 6 h.
7. The particle-modified cellulose is immersed in liquid nitrogen, followed by freeze-drying until all water has been removed from the network.

The particles attached to the fibres were determined to have an average size of approx. 70-90 nm, as determined from FE-SEM microscopy.

Example 9

($Fe_3O_4$)

1. A piece of gel-like bacterial cellulose (0.5×0.5×1.5 cm) is boiled with 10 vol % NaOH solution (3 h) and subsequentially washed with running distilled water (6 h) before immersion in liquid nitrogen followed by freeze-drying during a period of 12 hours.
2. The dry cellulose piece is swollen in freshly prepared MilliQ-water solution of metal salt consisting of $FeSO_4 \times 7H_2O$ (0.165 M).
3. The solution with the immersed piece of cellulose is heated to 90° C. and kept at 90° C. for 3 h in order to thermally force the precipitation of the iron salt solution to the related hydroxide/oxide structures of the iron ions inside the matrix network of the bacterial cellulose.
4. The piece is transferred into a water solution of ammonia (12.5%) at r.t. with $KNO_3$ (0.25 M). The piece is kept in the alkaline solution for 6 h.
5. The piece is transferred into room temperature distilled water in order to neutralize the alkaline solution inside the cellulose network matrix.
6. The particle-modified cellulose network is washed with running distilled water for 6 h.
7. The particle-modified cellulose is immersed in liquid nitrogen, followed by freeze-drying until all water has been removed from the network.

The particles attached to the fibres were determined to have an average size of approx. 120-130 nm, as determined from FE-SEM microscopy.

Example 10

($NiFe_2O_4$)

1. A piece of gel-like bacterial cellulose (0.5×0.5×1.5 cm) is boiled with 10 vol % NaOH solution (3 h) and subsequentially washed with running distilled water (6 h) before immersion in liquid nitrogen followed by freeze-drying during a period of 12 hours.

2. The dry cellulose piece is swollen in freshly prepared MilliQ-water solution of metal salt consisting of NiCl$_2$×6H$_2$O (0.055 M) and FeSO$_4$×7H$_2$O (0.11 M),
3. The solution with the immersed piece of cellulose is heated to 90° C. and kept at 90° C. for 3 h in order to thermally force the precipitation of the nickel/cobalt salt solution to the related hydroxide/oxide structures of the nickel/iron ions inside the matrix network of the bacterial cellulose.
4. The piece is transferred into a water solution of ammonia (12.5%) at r.t. with KNO$_3$ (0.25 M). The piece is kept in the alkaline solution for 6 h.
5. The piece is transferred into room temperature distilled water in order to neutralize the alkaline solution inside the cellulose network matrix.
6. The particle-modified cellulose network is washed with running distilled water for 6 h.
7. The particle-modified cellulose is immersed in liquid nitrogen, followed by freeze-drying until all water has been removed from the network.

The particles attached to the fibres were determined to have an average size of approx. 400-600 nm (as determined from FE-SEM microscopy) and separated by a distance of approx. 5 μm.

Example 11

(CoFe$_2$O$_4$)

1. A piece of gel-like bacterial cellulose (0.5×0.5×1.5 cm) is boiled with 10 vol % NaOH solution (3 h) and subsequentially washed with running distilled water (6 h) before immersion in liquid nitrogen followed by freeze-drying during a period of 12 hours.
2. The dry cellulose piece is swollen in freshly prepared MilliQ-water solution of metal salt consisting of CoCl$_2$×6H$_2$O (0.055 M) and FeCl$_3$×6H$_2$O (0.11 M), i.e. stoichiometric proportions of Co$^{2+}$:Fe$^{3+}$ (1:2).
3. The solution with the immersed piece of cellulose is heated to 90° C. and kept at 90° C. for 3 h in order to thermally force the precipitation of the cobalt/iron salt solution to the related hydroxide/oxide structures of the cobalt/iron ions inside the matrix network of the bacterial cellulose.
4. The piece is transferred into a water solution of NaOH (1.32 M) at 90° C. The piece is kept in the alkaline solution at 90° C. for 6 h.
5. The piece is transferred into room temperature distilled water in order to neutralize the alkaline solution inside the cellulose network matrix.
6. The particle-modified cellulose network is washed with running distilled water for 6 h.
7. The particle-modified cellulose is immersed in liquid nitrogen, followed by freeze-drying until all water has been removed from the network.

The "platelet-like" particles attached to the fibres were determined to have an average size of approx. 100-150 nm in width and 30-40 nm in thickness, as determined from FE-SEM microscopy.

Example 12

(ZnFe$_2$O$_4$)

1. A piece of gel-like bacterial cellulose (0.5×0.5×1.5 cm) is boiled with 10 vol % NaOH solution (3 h) and subsequentially washed with running distilled water (6 h) before immersion in liquid nitrogen followed by freeze-drying during a period of 12 hours.
2. The dry cellulose piece is swollen in freshly prepared MilliQ-water solution of metal salt consisting of ZnCl$_2$×4H$_2$O (0.055 M) and FeSO$_4$×7H$_2$O (0.11 M), i.e. stoichiometric proportions of Zn$^{2+}$:Fe$^{2+}$ (1:2).
3. The solutions with the immersed piece of cellulose is heated to 90° C. and kept at 90° C. for 3 h in order to thermally force the precipitation of the zinc/iron salt solution to the related hydroxide/oxide structures of the zinc/iron ions inside the matrix network of the bacterial cellulose.
4. The piece is transferred into a water solution of ammonia (12.5%) at r.t. with KNO$_3$ (0.25 M). The piece is kept in the alkaline solution for 6 h.
5. The piece is transferred into room temperature distilled water in order to neutralize the alkaline solution inside the cellulose network matrix.
6. The particle-modified cellulose network is washed with running distilled water for 6 h.
7. The particle-modified cellulose is immersed in liquid nitrogen, followed by freeze-drying until all water has been removed from the network.

The particles attached to the fibres were determined to have an average size of approx. 100-150 nm in diameter, as determined from FE-SEM microscopy.

Although the present invention has been described in considerable detail with reference to certain embodiments, one skilled in the art will appreciate that the present invention can be practiced by other than the described embodiments and examples, which have been presented for purposes of illustration and not of limitation. Therefore, the scope of the appended claims should not be limited to the description of the examples contained herein.

The invention claimed is:
1. A method for forming magnetic nanoparticle cellulose material comprising the steps of:
   a. providing cellulose material in a solution,
   b. adding the cellulose material from step (a) to a solution of metal ions,
   c. precipitating metal hydroxide/oxide complexes formed in the solution from step (b) spreading/distributing the precipitated complexes on the cellulose material,
   d. adding the precipitated metal hydroxide/oxide complexes to an alkaline solution converting the hydroxide/oxide complexes to magnetic nanoparticles, and
   e. freeze-drying or solvent exchanging the material from step (d) to preserve agglomerate free and evenly distributed magnetic nanoparticles physically attached on the cellulose material thereby forming the magnetic nanoparticle cellulose material,
   wherein the magnetic nanoparticle cellulose material comprises a network of cellulose nanofibres and any collection of nanoparticles with a particle to particle interdistance of ≤5 nm is composed of less than 20 nanoparticles.
2. The method of claim 1 wherein the step (b) is replaced with step (b'), wherein step (b') is:
   freeze-drying the cellulose material solution from step (a), in order to remove the H$_2$O in the cellulose material, then adding the freeze-dried solution to a solution of metal ions.
3. The method of claim 1 wherein the alkaline solution in step (d) is selected from the group consisting of NaOH, KOH, LiOH, and NH$_3$, wherein the alkaline solution provides a pH above 7.0.

4. The method of claim 1 wherein the metal ions in the solution are selected from the group consisting of the coordination compounds from the d-block elements in the periodic table, metal ion hydroxide complexes, and metal ion oxide complexes.

5. The method of claim 4 wherein the stoichiometric relation between the metal ion complexes are in the rage of 1:1.5 to 1:2.5.

6. The method of claim 1 wherein step (b) is performed until the cellulose material is saturated.

7. The method of claim 1 wherein the alkaline solution in step (d) comprises NaOH and a mild oxidation agent.

8. The method of claim 1 wherein the alkaline solution in step (d) comprises NaOH and $KNO_3$.

9. The method of claim 7 wherein the alkaline solution in step (d) has an initial pH of above 7.0.

10. The method of claim 1 wherein the solution in step (c) is heated to above 50 °C., at 1 atm.

11. The method of claim 1 wherein a polymer is added after step (e).

12. The method of claim 1 wherein the cellulose material is bacterial cellulose material.

13. The method of claim 1 wherein the cellulose material is selected from the group consisting of a plant, a tree, pulp, and cotton.

14. The method according to claim 1 wherein the magnetic nanoparticle cellulose material is a hydrogel or an aerogel.

15. A magnetic nanoparticle cellulose material comprising a network of cellulose nanofibres, wherein any collection of magnetic nanoparticles with a particle to particle inter-distance of ≤5 nm is composed of less than 20 nanoparticles.

16. The magnetic nanoparticle cellulose material according to claim 15 wherein the density range is between 5 $kg/m^3$-1000 $kg/m^3$.

17. The magnetic nanoparticle cellulose material according to claim 15 wherein the nanofibre diameter is in the range of 1-100 nm.

18. The magnetic nanoparticle cellulose material according to claim 15 wherein the magnetic nanoparticle cellulose material has a ferrite content between 10%-90%.

19. The magnetic nanoparticle cellulose material according to claim 15 wherein the nanoparticles have a size in the range of 1-500 nm referred to as the number average particle size determined by Transmission Electron Microscopy or Scanning Electro Microscopy.

20. The magnetic nanoparticle cellulose material according to claim 15 wherein the cellulose material is bacterial cellulose material.

21. The magnetic nanoparticle cellulose material according to claim 15 wherein the magnetic nanoparticle cellulose material is a hydrogel or an aerogel.

22. The magnetic nanoparticle cellulose material according to claim 15 wherein the magnetic nanoparticle cellulose material network of cellulose nanofibres is impregnated with a liquid of a monomer, a prepolymer or a polymer.

23. The magnetic nanoparticle cellulose material according to claim 22 wherein the impregnated magnetic nanoparticle cellulose material is solidified.

\* \* \* \* \*